United States Patent [19]
Kohl

[11] 3,966,869
[45] June 29, 1976

[54] FORMING A REMOVABLE CLOSURE MEMBER IN SITU

[76] Inventor: Gerald C. Kohl, 1106 S. Fourth St., Tacoma, Wash. 98405

[22] Filed: Apr. 14, 1972

[21] Appl. No.: 244,018

[52] U.S. Cl. .......... 264/242; 128/252; 215/11 R; 264/267; 264/297

[51] Int. Cl.[2] .......... B32B 31/04; B29C 6/04; A61J 9/00

[58] Field of Search .......... 264/242, 273, DIG. 41, 264/267; 215/11 R, 11 C, 47; 128/252

[56] References Cited

UNITED STATES PATENTS

| | | | |
|---|---|---|---|
| 2,628,910 | 2/1953 | Horan | 215/11 C |
| 2,659,510 | 11/1953 | Jung | 215/47 |
| 2,948,937 | 8/1960 | Rapata | 24/73 |
| 3,286,010 | 11/1966 | Groningen | 264/242 |
| 3,489,829 | 1/1970 | Lipfert | 264/273 |
| 3,556,331 | 1/1971 | Towns | 215/47 |
| 3,591,996 | 7/1971 | Shanok | 264/273 |
| 3,653,098 | 4/1972 | Lagarde et al. | 264/273 |

*Primary Examiner*—Robert F. White
*Assistant Examiner*—James B. Lowe
*Attorney, Agent, or Firm*—Christensen, O'Connor, Garrison, & Havelka

[57] ABSTRACT

A method for forming a removable closure member for the nipple aperture in a disposable nursing bottle and a method for forming a reusable connector for a bag, pouch or the like.

The removable closure member is molded by placing a first die in contact with one surface of the nipple of a nursing bottle, the first die having a first cavity communicating with the opening in the nipple, placing a second die in contact with the opposing surface of the nipple, the second die having a second cavity communicating with the opening, and injecting a settable composition into one of the cavities and through the opening into the other cavity.

4 Claims, 9 Drawing Figures

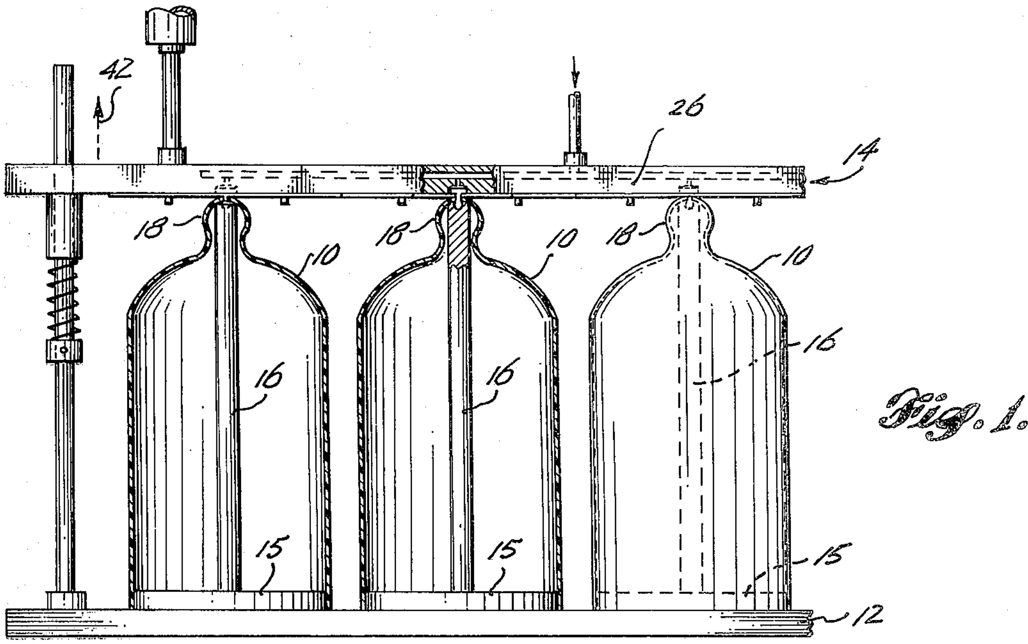
Fig. 1.
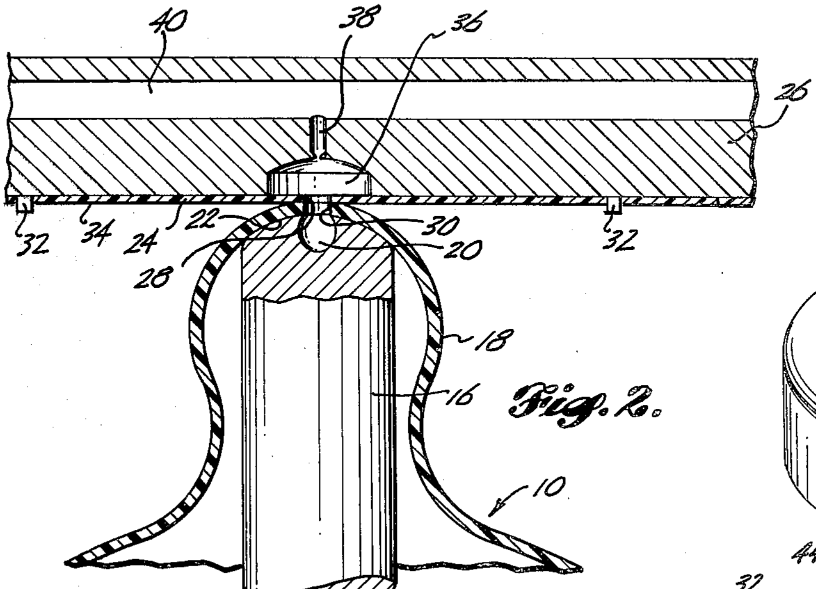
Fig. 2.
Fig. 4.
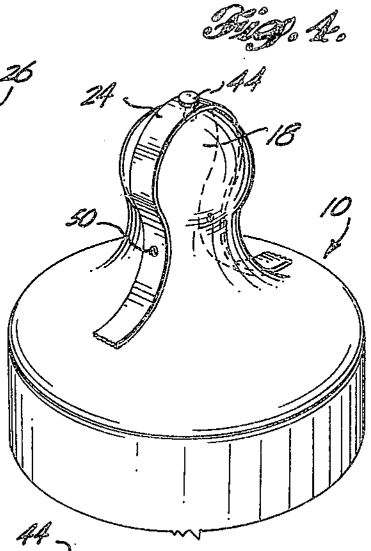
Fig. 3.
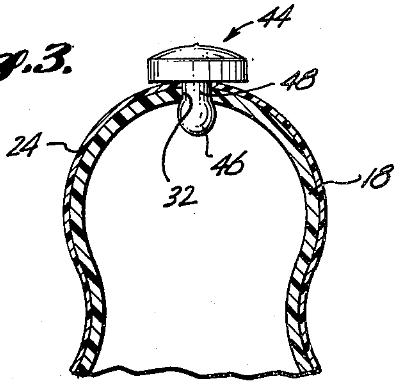
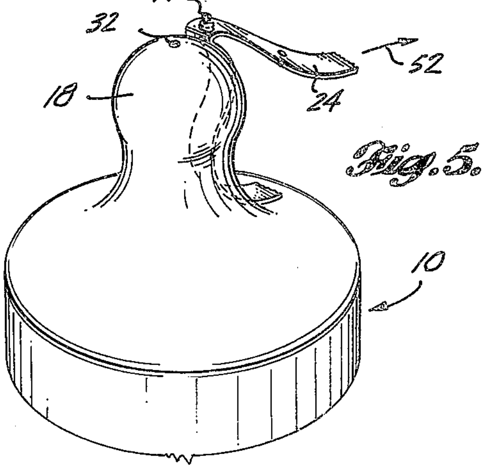
Fig. 5.

FORMING A REMOVABLE CLOSURE MEMBER IN SITU

BACKGROUND OF THE INVENTION

The present invention relates to the method for molding a closure member and more particularly to a method for molding in situ a closure member in the opening.

Molding techniques of the prior art utilized for making closure members employ separate operations whereby the member to be closed is formed in a first operation and the closure member is formed in a second operation. These techniques require subsequent assembly and give rise to various problems. For example, if the member to be closed is a liquid-carrying container tolerance levels must be maintained at high accuracy to prevent leakage or spillage when the closure member is inserted into the member to be closed. Furthermore, breakage and loss can become quite high in an assembly operation. Also, the separate assembly operation requires a certain amount of manual labor since often times the closure member cannot be inserted automatically.

It is an object of the present invention to provide a simple inexpensive method for forming a closure member for an aperture in a container. It is furthemore an object of the present invention to provide a simple, inexpensive method of manufacturing a closure bar for a flexible bag, pouch or the like.

It is an object of the present invention to provide a method whereby an accurately fitting closure member can be positioned in an apeture in a container so that the aperture and closure member form a liquid-tight seal. It is a related object of the present invention to provide a closure member which can be easily removed without damage to the aperture. It is a related object of the present invention to provide means for assisting the removal of the closure member from the aperture. It is a related object of the present invention to provide a method for forming a closure member in the nipple aperture of a disposable infant feeding bottle.

It is a further object of the present invention to provide a reusable closure strip for a pouch or bag. It is a related object of the present invention to provide a method of forming a closure strip containing a plurality of buttons in situ in a pair of reinforcing strips at the mouth of the bag or pouch. It is a related object of the present invention to provide a method for making a closure strip for a bag or pouch which can be manufactured after or prior to the time the bag is filled. It is a further object of the present invention to provide a closure strip which will not interfere with ingress and egress through the mouth of the bag. It is a related object of the invention to provide a simple reusable closure member for the mouth of the bag.

It is a further object of the present invention to provide a closure means which is adaptable for use on pouches, bags or the like and which can also be utilized as a garment closure. It is a related object of the present invention to produce a closure strip which can be installed by heat fusion methods or which can be installed by conventional garment attachment, for example as by sewing.

SUMMARY OF THE INVENTION

The present invention provides a method for molding a closure member for an opening communicating between two surfaces of a material comprising placing a first die in contact with one surface of the material, the first die having a first cavity communicating with the opening, placing a second die in contact with the opposing surface of the material, the second die having a second cavity communicating with the opening, injecting a settable composition into one of the cavities under pressure to cause the composition to flow from the one of the cavities through the opening into the other of the cavities.

BRIEF DESCRIPTION OF THE DRAWINGS

A better understanding of the present invention can be acquired by reading the ensuing specification in conjunction with the accompanying drawings wherein:

FIG. 1 is a pictorial view of a plurality of disposable nursing bottles situated in an injection molding apparatus in preparation for formation of a closure member;

FIG. 2 is an enlarged view of a portion of FIG. 1 in partial cross section;

FIG. 3 is an enlarged view in partial cross section showing the molded in situ closure member after the molding apparatus has been removed;

FIG. 4 is an isometric view of the closure member and pull tab of the present invention in place on a nipple;

FIG. 5 is an isometric view showing removal of the closure member from the nipple;

FIG. 6 is an exploded isometric view of another embodiment of the invention showing in situ formation of a closure strip for a bag, pouch or the like;

DESCRIPTION OF PREFERRED EMBODMENTS

Figure 6:
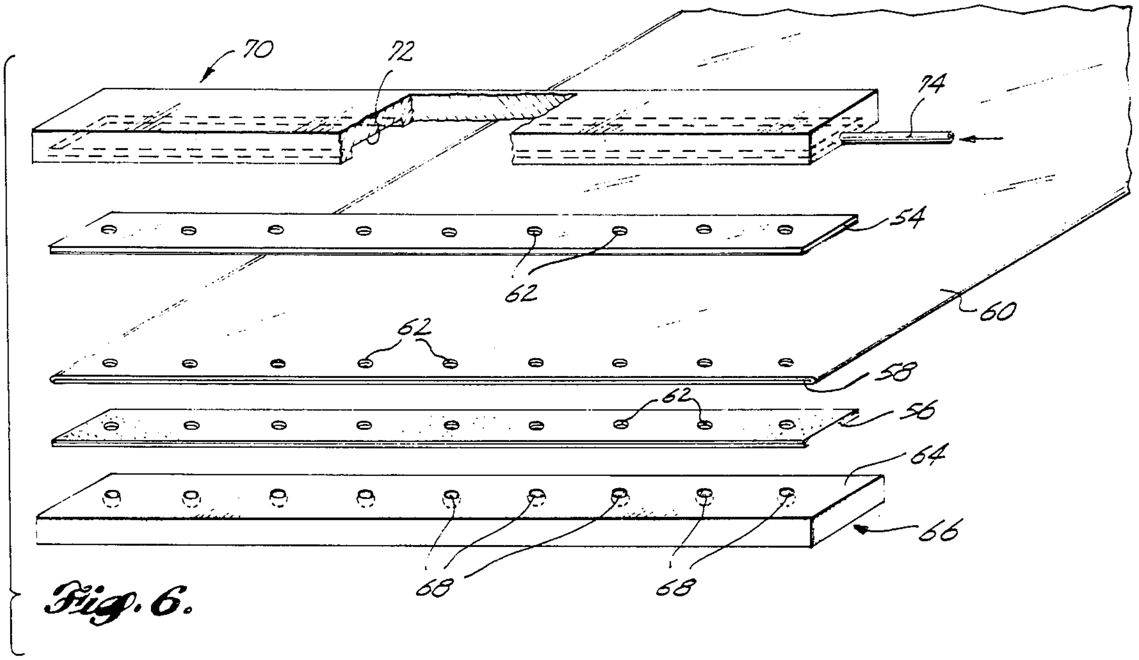

Referring first to FIG. 1 a plurality of tube like nursing bottles 10 are illustrated resting on a platform 12 of a molding machine, generally designated 14. Nursing bottles 10 are preferable composed of a thin-walled polymeric material. The nursing bottles 10 are designed to be filled with an infant feeding formula. As can be seen, the nursing bottles contain no bottom. The bottles are filled with feeding formula after the closure member of the present invention has been molded in situ, after which a bottom cap is sealed to the bottom portion of the nursing bottles 10. The nursing bottles are designed to collapse while the infant is feeding, thus reducing the possibility of ingestion of air into the baby's stomach. Disposed on the platform 12 are a plurality of discs 15 which serve as alignment guides for the bottles to position them on the base 12. A mandrel 16 extends upwardly from the discs 15 and has its upper end positioned within the bulbous nipple 18 on the nursing bottle 10. The upper end of the mandrel 16 contains a mold cavity for one portion of the closure member of the present invention.

Referring jointly to FIGS. 1 and 2, a recess or lower mold cavity 20 is located in the upper end of the mandrel 16. The upper end 22 of the mandrel is curved to generally conform to the interior surface shape of the nipple 18. A strip of tape 24 is disposed on the bottom of the upper mold cavity and injection manifold 26. The tape 24 contains an aperture 28 which is of generally the same size as the upper portion of the mold cavity 20 and the opening 30 in the nipple. In a preferred embodiment of the invention the opening 28 and upper portion of the cavity 20 have a circular cross section. Guide pegs 32 on the bottom of the injection manifold 26 provide a means for registration of the opening 28 with the opening 30 in the nipple 18. Thus the upper end of the cavity 20, the opening in the nipple 32 and the opening in the tape 24 are registered. If desired, the tape 24 can contain an adhesively-backed surface 34 to cause the tape 24 to adhere to the outer surface of the nipple after the molding operation has been completed.

The injection manifold 26 contains a recess or upper mold cavity 36 which communicates with the opening 28 in the tape 24, the opening 30 in the nipple, and the cavity 20. Generally, it is preferred that the portion of the cavity 36 which mates with the tape 24 at its upper surface have a larger cross section than the opening in the tape and nipple. This will prevent the closure member to be formed from inadvertently being pushed into the bottle 10.

An injection channel 38 leads into the cavity 36 from an injection supply channel 40. When the mandrel 16, nipple 18, tape 24 and upper manifold 26 are in position, a molding composition is injected into the supply channel 40. It thereafter travels through the channel 38 into the upper cavity 36. From cavity 36 the molding composition flows through the tape opening 28, the nipple opening 30 and into the cavity 20. While this operation is being conducted the manifold 26 is held firmly in the position shown. If desired, the manifold 26 can be forced tightly against the nipple to prevent any leakage of the injection molding composition.

After the cavities 36 and 20 have been filed with molding composition and the molding composition has set, the manifold 26 can be raised away from the nipple in the direction of arrow 42 (FIG. 1). Thus a closure member or button 44 as shown in FIG. 3 is formed. As the manifold 26 is being lifted away, the small portion of the moldable composition communicating between the cavity 36 and the channel 38 will break away to leave the button 44 in place on the nipple 18. Thereafter the disposable bottle 10 can be removed from the mandrel 16 and disc 15. At the same time the bottom portion 46 of the button 44 formed in cavity 20 will separate from the cavity 20. As can be seen, the tape 24 can be positioned downwardly over the nipple 18 as shown in FIG. 4 to complete the formation of the closure member in the nipple 18.

It is desirable that the molding composition utilized to form the closure button 44 be of a slightly resilient material. This will allow easy separation of the bottom portion 46 from the mandrel 16 and will provide an excellent seal between the plug-like neck or shaft 48 of the button 44 and the surrounding opening 30 in the nipple. Also if such a resilient composition is used, easy separation of the button from the nipple opening can be accomplished with little or no damage to the size of the opening 30 in the nipple 18. If a relatively nonresilient material were to be utilized the cavity 20 would have to be reshaped so that the lower portion 46 of the button could be easily withdrawn from the cavity 20. It is to be understood that any of a variety of materials can be utilized for this aspect of the prsent invention.

As shown in FIG. 4, the finished product is illustrated. The tape 24 has been formed around the side of the nipple 18. The neck of the button 44 is positioned in the opening in the nipple. A small hole 50 which can be seen in the tape 24 is the tape registration hole which registered with guide pegs 32 on the injection manifold 26. When the button 44 is removed prior to using the infant feeding bottle 10, one end of the tape is grasped and is pulled in the direction of arrow 52 as shown in FIG. 5. The enlarged head portion of the closure button 44 will be retained by the tape, thus separating the small end of the button 44 from the opening 30 in the nipple 18. The tape is then fully removed from the nipple 18 prior to use.

The foregoing aspect of the prsent invention provides an easily formed closure member for a pre-filled disposable infant feed bottle. With the present closure member all that need be done by the consumer is a quick pull on the tape or tab 24 to remove the closure button 44. In addition, production of the closure member for a disposable infant feeding bottle in accord with the present invention is considerably less expensive and considerably simpler to manufacture. Thus, the nipple 18 and container 10 can be unitarily formed as pictorially shown in FIG. 1. Only four operations are required to produce a prefilled infant feeding bottle which is disposable using this method. Those steps are (1) formation of the container and nipple, (2) formation of the closure button, (3) filling of the container with infant feeding formula and (4) positioning and permanently sealing the bottom on the container. The prefilled disposable bottles are then ready for packaging and distribution after sterilization.

In accord with a second aspect of the present invention a closure member for pouches or bags or the like is disclosed. This method utilizes the basic concept employed in making the closure button described above. However, in this aspect of the invention a separate closure strip is provided. This closure strip can be reused if desired, thus making a longer-lasting disposable or nondisposable packaging product.

Referring to FIG. 6 a second embodiment of the invention is illustrated. In this embodiment of the invention two reinforcing strips 54 and 56 are adhesively attached to the mouth 58 of a plastic bag 60 or the like. As shown, a pluarlity of holes 62 have been punched through the reinforcing strips 54 and 56 and the bag 60. The holes 62 are punched after the strips 54 and 56 have been applied to the pouch 60, although it is contemplated that the strips 54 and 56 and pouch 60 can be prepunched. If prepunched, however, alignment of the holes 62 will present an additional processing step.

After the reinforcing strips 54 and 56 have been secured adjacent the mouth 58 of the bag 60, the combined structure is placed on a lower mold member 66 so that the outer surface of strip 56 lies flat against face 64. The holes 62 are aligned with a plurality of cavities 68 in the lower mold 66. Thereafter an upper mold member 70 is positioned against the top surface of reinforcing strip 54. Upper mold member 70 contains a cavity 72 which communicates with the plurality of holes 62 in the reinforcing strip 54.

Figure 7:
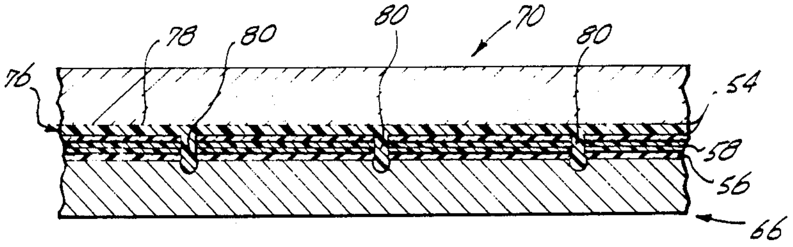
FIG. 7 is a cross-sectional view showing the mold and the closure strip immediately after formation.

A settable molding composition is injected through inlet conduit 74 into the cavity 72. The molding composition fills the cavity 72, flows through the holes 62 in the strips 54, pouch 60 and strip 56 and into the cavity 68 in the lower mold 66. The molding operation produces a structure as shown in FIG.7. The settable composition, any of a variety of thermosetting or thermoplastic polymers, produces a closure strip 76. As can be seen, the closure strip 76 includes an upper elongate strip portion 78 containing a plurality of downwardly extending pegs or closure buttons 80. The pegs 80 further extend into the cavities 68 in lower mold member 66. The cavities 68 in lower mold member 66 are slightly enlarged relative to the diameter of the central portion of the pegs 80.

Figure 8:
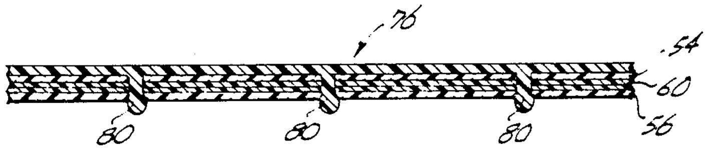
FIG. 8 is a cross-sectional view of the closure strip after the mold has been removed.

When the mold members 66 and 70 are removed as shown in FIG. 8, the closure strip 76 will retentively engage the reinforcing strips 56 and 54 and will maintain the mouth 58 of bag 60 in a closed position.

Figure 9:
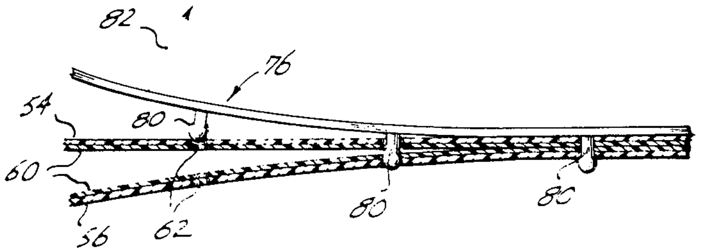
FIG. 9 is an elevation view showing the operation of the closure strip.

As shown in FIG. 9, to open the bag 60 the closure strip 76 is grasped by hand and pulled in the direction of arrow 82, separating the pegs 80 from the holes 62. Thus the mouth of the bag 60 can be separated for access to the interior of the bag.

The present invention has been described in relation to preferred embodiments thereof. It is to be recognized that one of ordinary skill in the closure molding art can make various changes, alterations, and substitutions of equivalents to the original concept as disclosed herein. It is intended therefore that the invention be limited only by the definition contained in the appended claims.

What is claimed is:

1. In the process of forming a removable closure member for the end opening in a bulbous, open-ended nipple or the like of resiliently flexible sheet material, the steps of interposing the nipple in the space between spaced mutually opposing surfaces of a pair of mold sections having mutually opposing recesses therein, one of which mold sections takes the form of an elongated mandrel which is inserted in the nipple and has a recess in the inserted end thereof, registering the end opening in the nipple with the recesses and while maintaining a seal about the opening between the inserted end of the mandrel and the surface of the other mold section, injecting a settable liquid molding composition into the cavity formed by the recesses and the opening in the nipple, to form the removable closure member, and relatively retracting the mandrel and the other mold section from the nipple and the closure member after the molding composition of the closure member has set in the cavity, said recesses having crosswise dimensions relatively parallel to the plane of the opening, which are adapted so that relatively enlarged inside and outside heads are formed on the closure member at the respective sides of the opening, the inside head formed in the recess of the mandrel, having a peripheral contour in directions extending relatively away from the opening, whereby the inside head is adapted to pass through the opening when a force is applied to the closure member in the direction of the outside head, relatively crosswise of the nipple and generally axially of the opening.

2. The process according to claim 1 wherein the inserted end of the mandrel is abutted with the inside surface of the nipple to form a seal about the opening on the inside thereof.

3. The process according to claim 1 further comprising the step of forming means on the closure member during the injection step, which project laterally thereof and generally parallel to the plane of the opening on the outside of the nipple, to be grasped for removing the closure member from the opening.

4. The process according to claim 3 wherein a strip of apertured material is interposed between the outside of the nipple and the other mold section, and the aperture thereof is registered with the opening in the nipple, and wherein the strip of apertured material and the nipple are clamped between the mold sections to form a seal about the opening during the injection step, said aperture having a crosswise dimension relatively parallel to the plane of the opening, adapted so that the strip is retained on the closure member between the nipple and the outside head of the closure member, to form means for removing the closure member.

* * * * *